No. 771,350.

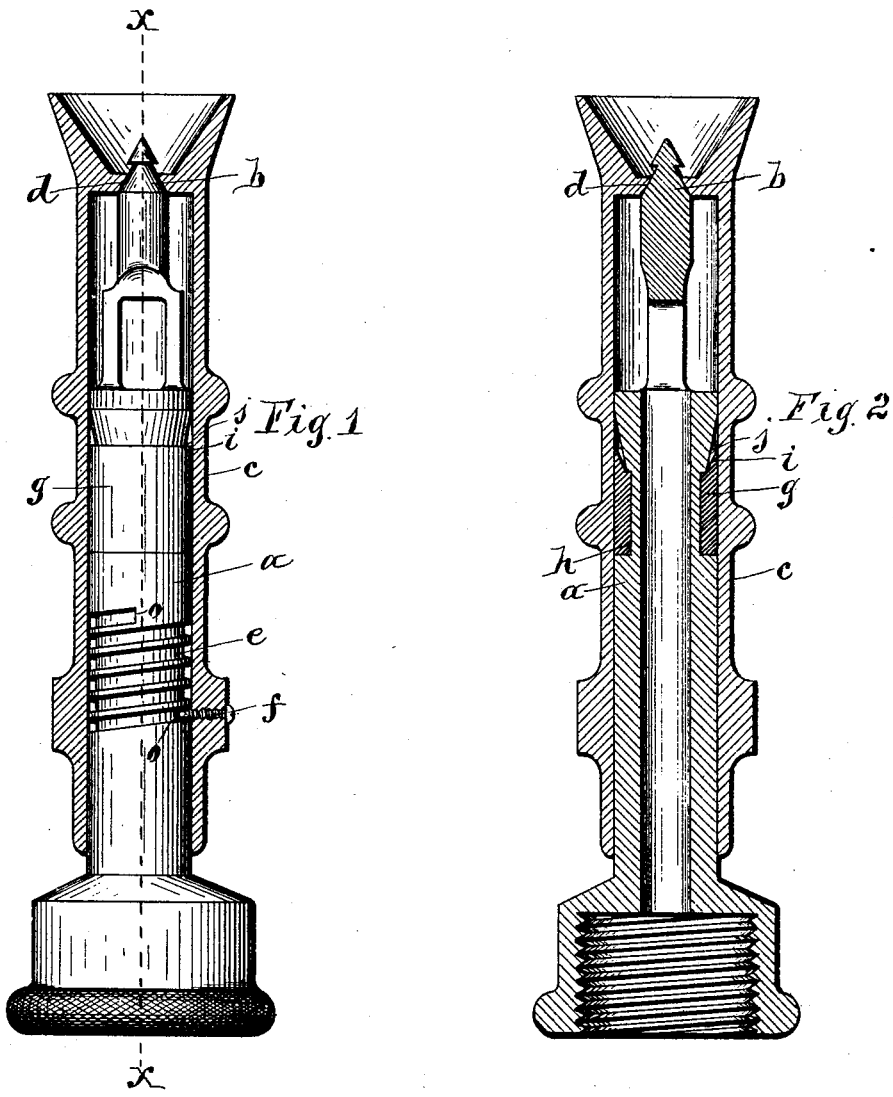

Patented October 4, 1904.

UNITED STATES PATENT OFFICE.

FRANK J. CHRISTMAN, OF SYRACUSE, NEW YORK.

HOSE-NOZZLE.

SPECIFICATION forming part of Letters Patent No. 771,350, dated October 4, 1904.

Application filed December 7, 1903. Serial No. 184,017. (No model.)

*To all whom it may concern:*

Be it known that I, FRANK J. CHRISTMAN, a citizen of the United States, and a resident of Syracuse, in the county of Onondaga, in the State of New York, have invented new and useful Improvements in Hose-Nozzles, of which the following, taken in connection with the accompanying drawings, is a full, clear, and exact description.

This invention relates to the class of hose-nozzles in which the water-discharge tube is provided with a conical valve entering an aperture in the end of a longitudinally-movable sleeve inclosing the said tube, the movement of said sleeve controlling the discharge of the water and varying said discharge to produce either a solid stream or a spray of water of different densities.

In practice it has been found that said hose-nozzles leak more or less out of the rear end of the adjusting-sleeve, owing to the back pressure of the water produced by the resistance of the partially-choked discharge-aperture of the nozzle.

The object of this invention is to provide the nozzle with a self-tightening packing which shall be securely retained in position without the use of extra attaching devices, such as collars or followers, screwed onto the piston or internal tube and pressing onto the packing-ring.

My invention thus simplifies the construction and reduces the cost of manufacturing the nozzle; and to that end the invention consists in the improved construction of parts hereinafter described, and illustrated in the annexed drawings, in which—

Figure 1 is a side view of the water-discharge tube with the inclosing sleeve shown in section; and Fig. 2 is a longitudinal section of said tube and its sleeve, taken on line X X in Fig. 1.

In the said drawings, $a$ denotes the water-discharge tube, which is provided with suitable means for securing it to the end of the water-supplying hose. This tube is provided with the usual conical valve $b$ and is inclosed in a snugly-fitting sleeve $c$, which is provided in its outer end with the discharge-aperture $d$ and is movable longitudinally on the tube $a$ to cause the valve $b$ to enter to a greater or less extent into the aperture $d$, and thereby regulate the flow of water from the nozzle.

To properly control the aforesaid movement of the sleeve, I prefer to provide the tube $a$ with a spiral groove $e$ in its exterior, and attached to the sleeve $c$ is a lug $f$, which engages the said groove and causes the sleeve to move longitudinally when turned on the tube $a$. The groove is terminated with abrupt cross-walls $o$ $o$ to limit the movement of the sleeve by the abutting of the stud-pin or screw $f$ on the ends of the groove.

This class of nozzles usually leak more or less at the rear end of the sleeve $a$, as hereinbefore stated. To overcome this defect, I employ a packing which tightens itself in accordance with the increase of the pressure of the water entering the nozzle. This packing consists of a ring or cylindrical band $g$, of rubber or other suitable elastic material, seated in a circumferential groove $h$ in the exterior of the tube $a$. The said groove is formed with square shoulders at its ends to serve as abutments for the body of the packing-ring, which is thus securely restrained from sliding longitudinally on the tube $a$. The packing-ring is sufficiently elastic to allow it to be sprung into the groove. Adjoining the forward end of the said groove is a circumferential depression $j$, formed in the exterior of the tube, the face of which depression is beveled outwardly to the periphery of the tube for the purpose herein presently explained.

The packing-ring $g$ is formed with a forwardly-extending circumferential flange $i$, which surrounds the depression $j$ and is beveled interiorly at a greater angle than the face of the depression and terminates in a thin edge, which stands free from the tube to admit water between said edges and side of the tube. The pressure of the admitted water causes the flange $i$ to automatically expand and form a water-tight joint between the tube and its inclosing sleeve $c$.

What I claim as my invention is—

In combination with the sleeve provided with the discharge-aperture, the discharge-tube provided with an exterior circumferential groove formed with square shoulders on its ends and with a forwardly-beveled circumferential depression extending from the front shoulder of said groove to the periphery of the tube, and an elastic packing-ring confined between the shoulders of said groove and formed with an expansible circumferential flange surrounding the aforesaid beveled depression of the tube and beveled interiorly at a greater angle to the periphery of the tube to admit water between the thin edge of the flange and side of the tube substantially as set forth and shown.

FRANK J. CHRISTMAN.

Witnesses:
　J. J. LAASS,
　FRED W. HAMMOND.